Sept. 5, 1939.　　　　　M. BEREK　　　　2,171,640
PHOTOGRAPHIC OBJECTIVE
Filed July 29, 1937
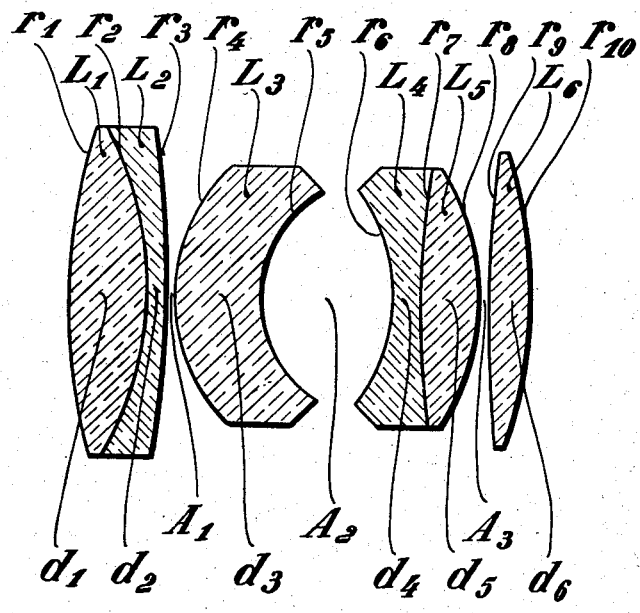
Max Berek INVENTOR Patented Sept. 5, 1939

2,171,640

UNITED STATES PATENT OFFICE 2,171,640

PHOTOGRAPHIC OBJECTIVE

Max Berek, Wetzlar, Germany, assignor to Ernst Leitz, G. m. b. H., Wetzlar, Germany Application July 29, 1937, Serial No. 156,293
In Germany August 15, 1936

4 Claims. (Cl. 88—57)

This invention relates to high speed dissymmetrical photographic objectives of a type which is known and which comprises two meniscus lenses with their concavities turned towards each other and which are placed between two outside collective lenses. The first and the third component is a cemented doublet.

It has heretofore been proposed to include in such a lens system doublet or triplet meniscus components and two front collective lenses. Such an arrangement required the use of a glass for the front collective lens of high refractivity which is undesirable because of its tendency to spot when used in very large aperture front lenses. To avoid this objection it was proposed to increase the number of exposed lens surfaces and this in turn is disadvantageous.

The disadvantages referred to may be avoided in a photographic objective in accordance with this invention which is embodied in a lens system comprising four members placed in air. The first member is a cemented doublet consisting of a biconvex front lens and a dispersive lens cemented together. The refractive index of the biconvex front lens is lower than 1.58 and in the said dispersive lens it is higher than 1.64. The radius of curvature of the cemented surface is at least one half and at the most double the radius of curvature of the first convex surface of the doublet. The second member is a meniscus in which the radius of the front surface, which faces the said first member, is, at the most, equal to the radius of curvature of the said cemented surface or, at the least, one quarter thereof. The third member is also a meniscus having a radius of curvature of its rear surface less, but not less than one quarter the radius of curvature of said cemented surface in the first member. Finally, the radius of curvature of the last surface of the fourth and last biconvex member is at least one half of, but does not exceed double the radius of curvature of the said cemented surface in the first member. The said radii are understood to be absolute values.

These improvements result in such a distribution of the aberrations upon the several surfaces that systems of this type having only eight air-exposed surfaces are feasible and practical even with an increased light transmitting capacity and at the same time a more favorable position of the astigmatic surfaces, smaller spherical zone and relatively great distance between the focal point on the image side and the last refracting surface are obtained. The meniscus which faces the object side and the collective element which faces the image side may each be a simple lens without limiting the scope of the invention.

These improvements further result in very favorable conditions for a high correction of the spherical and chromatical aberrations, as well as correcting for coma, astigmatism and distortion if a stable type of glass is used in front of the system.

The system is illustrated in the accompanying drawing in which the several lenses counting from the front are marked L1, L2, etc. The radii of curvature are marked $r1$, $r2$, etc. The spaces between the lenses are marked A1, A2 and A3. The axial dimensions are marked $d1$, $d2$, etc.

The following example gives the data in accordance with the invention for a lens system with the focal length of one (1.0), said system having a cemented surface in the first and third member. The radii, axial thicknesses and air spaces are given in terms of the focal length of the system. The radius is plus when convex to the incoming light.

| Number of surface | Specific power $\phi$ | Seidel's coefficients |||||
|---|---|---|---|---|---|---|
| | | A | B | $r$ | P | $\Delta$ |
| 1 | +0.36 | +0.23 | +0.23 | +0.23 | +0.37 | +0.59 |
| 2 | −0.13 | −0.82 | +0.19 | −0.04 | −0.07 | +0.03 |
| 3 | +0.43 | +0.55 | −0.48 | +0.42 | +0.17 | −0.52 |
| 4 | +0.83 | +1.11 | +0.71 | +0.45 | +1.16 | +1.03 |
| 5 | −0.95 | −1.53 | −1.39 | −1.26 | −1.72 | −2.70 |
| 6 | −0.84 | −1.97 | −0.40 | −0.08 | −1.20 | −0.26 |
| 7 | +0.01 | +0.00 | +0.01 | +0.04 | +0.01 | +0.14 |
| 8 | +0.75 | +1.46 | +0.75 | +0.39 | +0.99 | +0.71 |
| 9 | −0.09 | −0.01 | +0.04 | −0.25 | +0.15 | +0.60 |
| 10 | +0.63 | +1.14 | +0.51 | +0.22 | +0.44 | +0.30 |
| Sum | +1.00 | +0.16 | +0.17 | +0.12 | +0.29 | −0.08 |

The data given in the following table show, by means of the so-called Seidel's coefficients, see U. S. Patent 2,164,028, June 27, 1939, how a lens of the given data may be constructed to provide a system corrected for said aberrations. The first column gives the "specific power" of each surface. This specific power indicates the percentage of the total power of the whole system of each surface according to its collective or dispersive action.

$f=1$

| Radii | Lens thicknesses | Air spaces | Refractive power |
|---|---|---|---|
| $r1=+1.0000$ | $d1=0.165$ | | L1=1.5647/55.8 |
| $r2=-0.5807$ | $d2=0.035$ | | L2=1.6727/32.2 |
| $r3=-2.3148$ | | A1=0.002 | |
| $r4=+0.3306$ | $d3=0.172$ | | L3=1.6259/35.6 |
| $r5=+0.2245$ | | A2=0.262 | |
| $r6=-0.3111$ | $d4=0.052$ | | L4=1.5955/39.2 |
| $r7=+1.7212$ | $d5=0.124$ | | L5=1.6204/60.3 |
| $r8=-0.3876$ | | A3=0.002 | |
| $r9=+2.6247$ | $d6=0.083$ | | L6=1.6204/60.3 |
| $r10=-0.8651$ | | | |

The data in the above second table show the small value of the Petzval sum, namely +0.17 in column (P). They also show the correction of distortion in the column (Δ). The conditions for correction of spherical aberration in column (A) are so favorable that greater apertures may be used. The conditions for correction of coma, column (B) and astigmatism column (r) are also favorable.

I claim:

1. A large aperture lens system for photography corrected for spherical and chromatic aberrations and also for coma, astigmatism and distortion, comprising two meniscus members placed with their concavities facing one another and two collective members arranged respectively in front and behind said meniscus members, said front collective member consisting of a front biconvex collective lens with a refractive index lower than 1.58 and a rear dispersive lens with a refractive index greater than 1.64 cemented together, the cemented surface therein, being at least one half but not exceeding double the radius of the first surface of the system, the rear of said two meniscus members consisting of a dispersive and a collective lens cemented together by a single cemented surface, the second and the fourth member being simple lenses without cemented surfaces.

2. A lens system according to claim 1 in which the radius of the front surface of the front meniscus member, calculated absolute, is at the most equal to or at least one quarter of the radius of the cemented surface in the front collective member.

3. A lens system according to claim 1 in which the radius of the rear surface of the rear meniscus lens, calculated absolute, is less but not less than one quarter of the radius of the cemented surface in the front collective member.

4. A lens system according to claim 1 in which the radius of the rearmost surface of the system, calculated absolute, is at least one half of but does not exceed double the radius of the cemented surface in the front collective member.

MAX BEREK.